1st Drying step

2nd Drying step

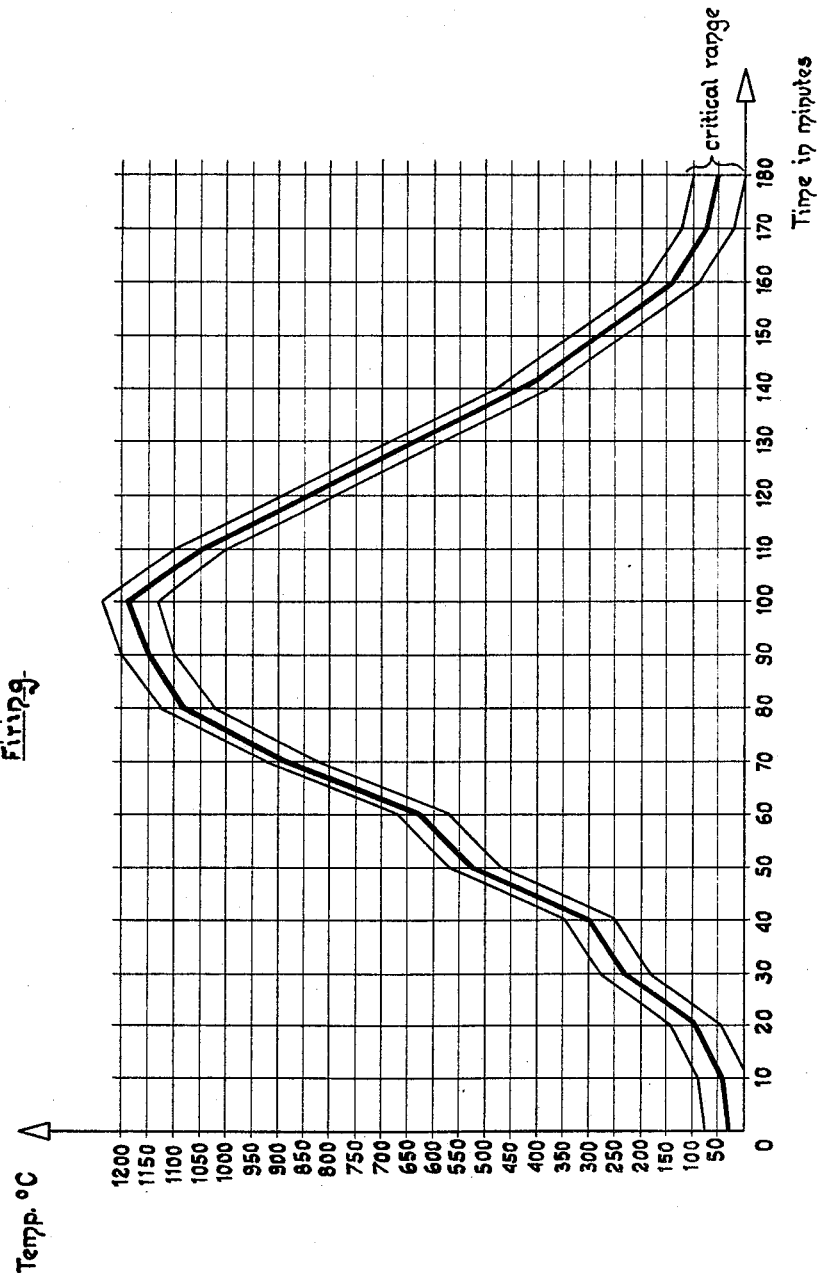

United States Patent Office 3,501,321
Patented Mar. 17, 1970

3,501,321
GLAZE AND BODY COMPOSITIONS FOR THE MANUFACTURE OF VITREOUS CHINA FLATWARE BY A FAST SINGLE FIRING PROCESS
Gianni B. Margola, Milan, Italy, assignor to Societa Ceramica Italiana Richard-Ginori S.p.A., Milan, Italy
Filed Oct. 28, 1966, Ser. No. 590,318
Int. Cl. C04b 33/34
U.S. Cl. 106—45       4 Claims

ABSTRACT OF THE DISCLOSURE

A process for preparing vitreous china comprising preparing a body composition consisting of 30–50% china clay, up to 20% ball clay, 10–40% quartz, 20–50% of feldspar or nepheline syenite and up to 15% of dolomite, whiting or talc and then coating the body composition with a glaze composition consisting essentially of 30–50% of feldspar or nepheline syenite, 20–30% quartz, 3–20% dolomite, 3–15% zinc oxide, 0.5–10% china clay, up to 12% boric acid, up to 25% whiting, and up to 10% of barium carbonate and firing the thusly coated body composition with no more than one firing at a temperature sufficient to result in a vitrified and non-porous mass but up to a maximum of 1125–1225° C. for a period of no more than five hours.

---

This invention relates to the preparation of ceramic products and in particular to the manufacture of vitreous china flatware for use in the form of plates and so forth.

It is an object of the invention to provide for a single firing cycle of no more than five hours at temperatures under 1300° C.

It is another object of the invention to provide compositions for obtaining products with a vitrified and non-porous mass by the use of a fast firing at low temperatures.

The percentages by weight of the various components in compositions of the invention may vary in the range indicated in the following:

|  | Percent |
|---|---|
| China clay | 30–50 |
| Ball clay | 0–20 |
| Quartz | 10–40 |
| Feldspar (or nepheline syenite) | 20–50 |
| Dolomite (or whiting or talc) | 0–15 |

According to economic advantage in the use of either one or the other of the various fluxes, it is possible to obtain a good vitrification with one of the following:
 (A) With nepheline syenite
 (B) With sodium feldspar having a high albite content
 (C) With a mixture of nepheline syenite and feldspar (sodium or potash feldspar)
 (D) With a mixture of nepheline syenite and dolomite (or whiting or talc)
 (E) With a mixture of feldspar (sodium or potash feldspar) and dolomite (or whiting or talc).

In the choice of either one of the above possibilities as well as in the choice of the percentage of feldspar (or nepheline syenite) and of dolomite (or whiting or talc) it is necessary to take into consideration the following factors which influence to a great extent the final characteristics of the product, from the point of view of a good vitrification:
 (a) Maximum firing temperature
 (b) Firing range at high temperature
 (c) Alkali content in feldspar and soda-potash ratio
 (d) Alkali content of other flux in china clay, ball clay and, eventually, in quartz.

The whiteness of the product is achieved by using very pure raw materials and by adding cobalt oxide (CoO 0.010–0.020% or an equivalent quantity of cobalt sulphate).

Hereinafter are listed examples of compositions that have given excellent results.

BODY—EXAMPLE No. 1

Mixture composition.—China clay, 39; ball clay, 6; quartz, 23; feldspar, 31; dolomite, 1.
Mineralogical composition.—Kaolinite, 43; quartz, 24; feldspar, 32; dolomite, 1.
Chemical composition.—$SiO_2$, 70.56; $Al_2O_3$, 23.91; $Fe_2O_3$, 0.30; CaO, 0.38; MgO, 0.25; $K_2O$, 1.05; $Na_2O$, 3.55.
Seger formula ($Al_2O_3=1$).—CaO, 0.029; MgO, 0.026; $Al_2O_3$, 1; $SiO_2$, 4.93; $K_2O$, 0.047; $Na_2O$, 0.242.

BODY—EXAMPLE No. 2

Mixture composition.—China clay, 39; ball clay, 6; quartz, 17; nepheline syenite, 38.
Mineralogical composition.—Kaolinite, 44; quartz, 18; feldspar and nepheline, 38.
Chemical composition.—$SiO_2$, 65.65; $Al_2O_3$, 27.05; $Fe_2O_3$, 0.25; CaO, 0.15; $K_2O$, 2.83; $Na_2O$, 4.07.
Seger formula ($Al_2O_3=1$).—CaO, 0.008; $K_2O$, 0.114; $Al_2O_3$, 1; $SiO_2$, 4.14; $Na_2O$, 0.248.

BODY—EXAMPLE No. 3

Mixture composition.—China clay, 41; quartz, 21; feldspar, 19; nepheline syenite, 19.
Mineralogical composition.—Kaolinite, 41.5; quartz, 23; feldspar and nepheline, 35.5.
Chemical composition.—$SiO_2$, 68.20; $Al_2O_3$, 24.92; $Fe_2O_3$, 0.30; CaO, 0.19; $K_2O$, 2.61; $Na_2O$, 3.78.
Seger formula ($Al_2O_3=1$).—CaO, 0.014; $K_2O$, 0.115; $Al_2O_3$, 1; $SiO_2$, 4.46; $Na_2O$, 0.250.

In the process of the invention, different glaze compositions are used. These glazes must be fit to the above bodies, i.e. they must have a coefficient of expansion less than that of bodies in order to have a good fitting of glaze to body, as is necessary for all ceramic products.

The peculiarity of these glazes is that they must melt and flow forming a bright, smooth surface in only 3–4 hours of firing, reaching the maximum temperature of about 1200° C. through a single firing along with body.

Conventional glazes for vitreous ware differ from the glazes proposed herein as the former require a longer firing, usually about 30–40 hours, reaching a maximum temperature of about 1100° C. and are applied to the articles which are previously fired at a high temperature of, for example, about 1250° C.

Besides the rapidity of firing, the glazes here proposed have the advantage of vitrifying by a single firing of body and glaze; they react deeply with the body to which they bind fast and create a mass which is non-porous and strong. The same thing does not happen with the glazes of conventional twice-fired tableware of vitreous china.

The glazes developed in this process correspond to the general formula whose components are included in the following ranges:

|  | Percent |
|---|---|
| Feldspar or nepheline syenite | 30–50 |
| Quartz | 20–30 |
| Dolomite | 3–20 |
| Zinc oxide | 3–15 |
| China clay | 0.5–10 |
| Boric acid | 0–12 |
| Whiting | 0–25 |
| Barium carbonate | 0–10 |

Their percentage varies between the above mentioned ranges according to the coefficient of expansion to be obtained in connection with the type of body which has been chosen among those illustrated and included in the general formula already mentioned.

Moreover, their percentage varies in the aforesaid ranges in connection with the maximum firing temperature and within the firing range, which have to be chosen from the firing curves established in accordance with the invention and according to the characteristics of fusibility of the different components.

Compared with conventional glazes for vitreous china tableware, the glazes of this process do not contain any lead compounds and can be formed by a mixture of uncrushed raw materials, without addition of fluxing frits or can contain only a small percentage of boric acid in the form of frit, within the limits indicated by the above general formula.

The compounds forming the frit with boric acid are selected according to the general rules for the preparation of ceramic frits.

Hereinafter are listed examples of glaze compositions which have given excellent results with this process.

GLAZE—EXAMPLE No. 1

Mixture composition.—Feldspar or nepheline syenite, 40; quartz, 28; dolomite, 16; zinc oxide, 9; china clay, 2; boric acid, 2.3; whiting, 2.7.

Chemical compositions.—$SiO_2$, 61.83; $Al_2O_3$, 9.47; CaO, 6.95; MgO, 3.95; $K_2O$, 1.58; $Na_2O$, 4.41; ZnO, 10.00; $B_2O_3$, 1.81.

Seger Formula (RO=1).—CaO, 0.28; MgO, 0.24; $K_2O$, 0.04; $Na_2O$, 0.16; ZnO, 0.28=1.00; $SiO_2$, 2.38; $Al_2O_3$, 0.21; $B_2O_3$, 0.06.

GLAZE—EXAMPLE No. 2

Mixture composition.—Nepheline syenite, 38; quartz, 28; dolomite, 5; zinc oxide, 8; china clay, 5; boric acid, 4.1; whiting, 11.9.

Chemical composition.—$SiO_2$, 59.61; $Al_2O_3$, 11.89; CaO, 9.15; MgO, 1.24; $K_2O$, 2.21; $Na_2O$, 4.29; ZnO, 9.01; $B_2O_3$, 2.60.

Seger Formula (RO=1).—$K_2O$, 0.059; $Na_2O$, 0.174; CaO, 0.410; MgO, 0.077; ZnO, 0.280; $SiO_2$, 2.500; $Al_2O_3$, 0.294; $B_2O_3$, 0.093.

GLAZE—EXAMPLE No. 3

Mixture composition.—Nepheline syenite, 33.0; quartz, 27.5; dolomite, 3.3; zinc oxide, 11.0; china clay, 5.4; whiting, 16.5; barium carbonate, 3.3.

Chemical composition.—$SiO_2$, 56.40; $Al_2O_3$, 10.24; CaO, 11.55; MgO, 0.82; $K_2O$, 1.97; $Na_2O$, 3.72; ZnO, 12.40; BaO, 2.90.

Seger Formula (RO=1).—$K_2O$, 0.044; $Na_2O$, 0.125; CaO, 0.430; MgO, 0.044; ZnO, 0.318; BaO, 0.039; $Al_2O_3$, 0.208; $SiO_2$, 2.06.

The accompanying drawing illustrates the processing of the above material. In the drawing:

FIGURE 3 is a chart illustrating the firing step.

Figure 1:
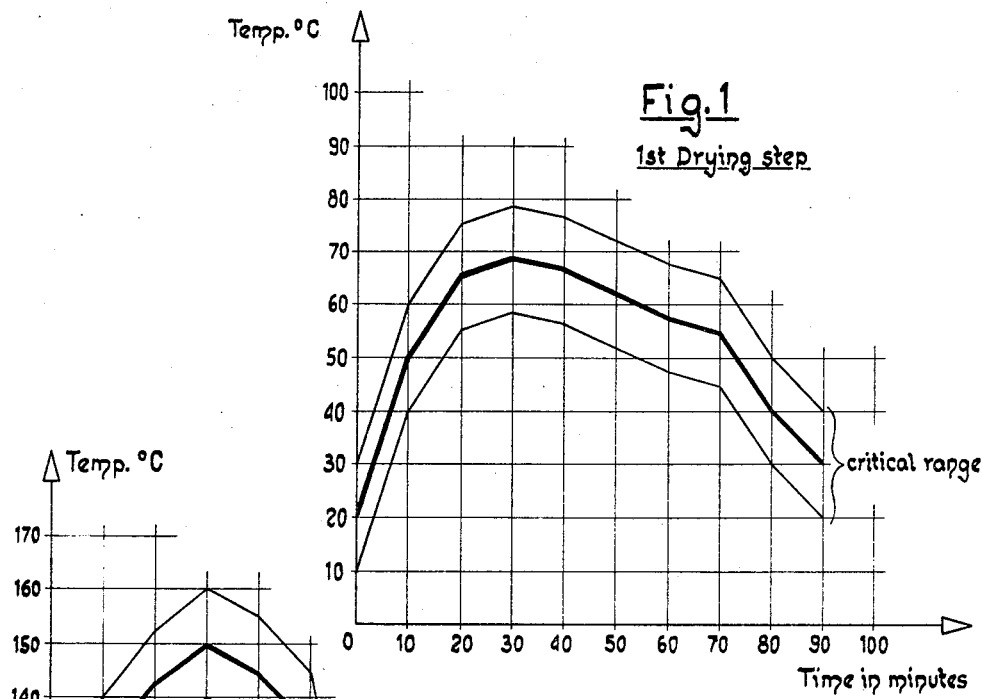
FIGURE 1 is a chart illustrating a first drying step.

According to the invention, the glaze is applied to the body preferably before the firing step. The body will be made (for example, as a biscuit) according to a composition of the aforementioned formula and will be subjected to a first drying step according to FIG 1. More particularly, the body (or bodies) formed will be brought from ambient temperatures to a temperature range of about 58–78° C. in about 30 minutes. Thereafter the temperature is gradually decreased for about 40 minutes to a range of about 47.5–62.5° C., whereafter the composition is removed from the heat source and permitted to cool at a natural pace.

Figure 2:
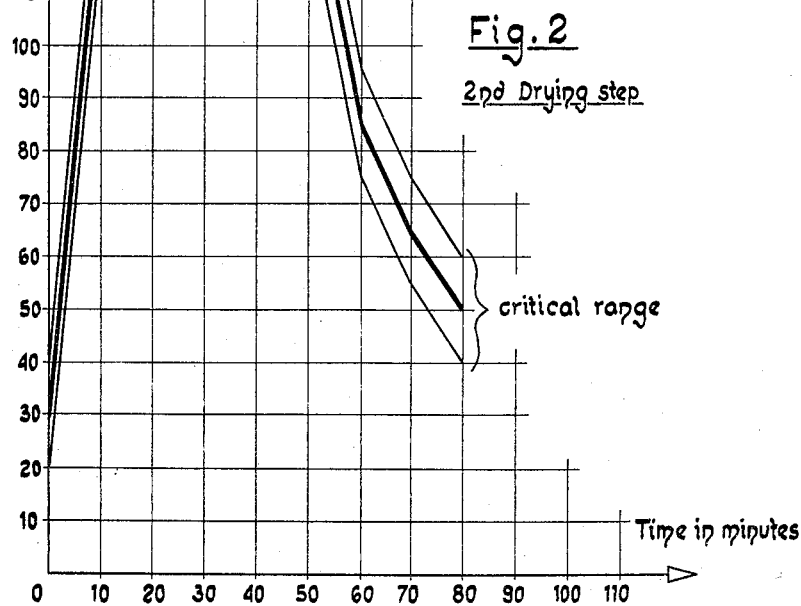
FIGURE 2 is a chart illustrating a second drying step.

Next the composition is subjected to a second drying step as shown by FIG. 2. In this step, the shaped body is brought to about 140–160° C. in about 40 minutes and is then cooled. The composition is thus set and the set body is ready for immediate further processing without interruption.

Finally a glaze according to the aforementioned formula is applied to the body and the resulting intermediate product is finished with a single firing. This firing is preferably below 5 hours and at a temperature of less than 1300° C. It is preferably conducted as illustrated in FIG. 3.

According to FIG. 3, the composition is brought to a temperature of 1125–1225° C. in about 100 minutes and is then cooled. By such treatment, the entire processing is completed without need for a second firing.

In the above nepheline syenite is a crystalline granular igneous rock composed of nepheline, potash feldspar, soda feldspar and a few minor accessory minerals, chiefly magnetite. It contains little or no free quartz. The mineral nepheline ($NaKO \cdot Al_2O_3 \cdot 2SiO_2$) has the following chemical analysis:

| | Percent |
|---|---|
| $SiO_2$ | 60.7 |
| $Al_2O_3$ | 20.3 |
| $Fe_2O_3$ | 0.08 |
| CaO | 0.7 |
| MgO | 0.1 |
| $Na_2O$ | 9.8 |
| $K_2O$ | 4.6 |
| Ignition loss | 0.7 |
| | 99.98 |

What is claimed is:

1. A process comprising preparing vitreous china from a body composition consisting essentially of 30–50% china clay, up to 20% ball clay, 10–40% quartz, 20–50% of at least one of the group consisting of feldspar and nepheline syenite, and up to 15% of at least one of the group consisting of dolomite, whiting and talc, coating the said body composition with a glaze composition consisting essentially of 30–50% of one of the group consisting of feldspar and nepheline syenite, 20–30% quartz, 3–20% dolomite, 3–15% zinc oxide, 0.5–10% china clay, up to 12% boric acid, up to 25% whiting, and up to 10% barium carbonate, and subjecting the thusly coated body composition to no more than one firing at a temperature sufficient to result in a vitrified and non-porous mass but up to a maximum of 1125–1225° C. for no more than five hours.

2. A process as claimed in claim 1 wherein the glaze composition consists essentially of nepheline syenite 33.0%, quartz 27.5%, dolomite 3.3%, zinc oxide 11.0%, china clay 5.4%, whiting 16.5%, barium carbonate 3.3%.

3. A process as claimed in claim 2 wherein the body composition consists essentially of china clay 39%, ball clay 6%, quartz 17%, nepheline syenite 38%.

4. A process as claimed in claim 2 wherein the body composition consists essentially of china clay 41%, quartz 21%, feldspar 19%, nepheline syenite 19%.

References Cited

UNITED STATES PATENTS

| 2,157,100 | 5/1939 | Rowland | 106—46 X |
| 2,635,058 | 4/1953 | Wooldridge | 106—45 X |
| 2,741,008 | 4/1956 | Snoddy | 106—45 X |
| 2,871,132 | 1/1959 | Hummel | 106—45 |
| 3,097,101 | 7/1963 | Lester | 106—46 |

HELEN M. McCARTHY, Primary Examiner

W. R. SATTERFIELD, Assistant Examiner

U.S. Cl. X.R.

106—46, 48; 117—125; 161—193